(12) United States Patent
Hasle

(10) Patent No.: US 12,422,413 B2
(45) Date of Patent: Sep. 23, 2025

(54) AUTOMATED SAMPLE HANDLING SYSTEM FOR LIQUID CHROMATOGRAPHY-MASS SPECTROMETRY

(71) Applicant: FIALab Insruments Inc., Seattle, WA (US)

(72) Inventor: Daniel Hasle, Seattle, WA (US)

( * ) Notice: Subject to any disclaimer, the term of this patent is extended or adjusted under 35 U.S.C. 154(b) by 403 days.

(21) Appl. No.: 18/086,709

(22) Filed: Dec. 22, 2022

(65) Prior Publication Data
US 2024/0210363 A1   Jun. 27, 2024

(51) Int. Cl.
*G01N 30/24*   (2006.01)

(52) U.S. Cl.
CPC .................. *G01N 30/24* (2013.01)

(58) Field of Classification Search
CPC ........... G01N 2030/8804; G01N 30/06; G01N 30/24; G01N 30/88; G01N 2030/027; G01N 30/04; G01N 30/7233; G01N 33/483; G01N 35/00; G01N 1/34; G01N 1/14; G01N 1/38; G01N 2035/00534; G01N 2035/0403; G01N 2035/0406; G01N 35/04; G01N 35/08; G01N 1/4044; G01N 2030/067; G01N 2030/8831; G01N 2035/00465; G01N 30/16; G01N 30/20; G01N 35/1097; G01N 35/085; G01N 2001/382; G01N 2035/00544; G01N 33/68; Y10T 436/11; Y10T 436/25; Y10T 436/2575
USPC .......................................... 73/863.01, 61.52
See application file for complete search history.

(56) References Cited

U.S. PATENT DOCUMENTS

| 9,719,890 B2 * | 8/2017 | Buchner .................. G01N 1/14 |
| 2017/0082585 A1 * | 3/2017 | DeWitte ............. H01J 49/0031 |

* cited by examiner

*Primary Examiner* — John E Breene
*Assistant Examiner* — Truong D Phan
(74) *Attorney, Agent, or Firm* — Alloy Patent Law; Walker Griffin Weitzel

(57) ABSTRACT

Presented is an automated fluid handling system for handling a biological fluid sample prior to being delivered for liquid chromatography-mass spectrometry (LCMS) analysis. The automated fluid handling system includes two multi-position selector valves fluidly connected to a hollow membrane fiber filter. Multiple syringe pumps are fluidly connected to the hollow membrane fiber filter. A purification column is fluidly connected to an outlet port of a multi-position selector valve. The automated fluid handling system is capable of conducting multiple operations needed before the liquid chromatography-mass spectrometry (LCMS) analysis.

16 Claims, 11 Drawing Sheets

AUTOMATED SAMPLE HANDLING SYSTEM FOR LIQUID CHROMATOGRAPHY-MASS SPECTROMETRY

TECHNICAL FIELD

The present invention generally relates to the field of sample preparation. More particularly, the present invention pertains to a biological sample handling system that is useful for sample treatment, sample purification, sample delivery, and sample analysis.

BACKGROUND

Biotherapeutics are drug therapy products where the active substance is extracted or produced from a biological source. Biotherapeutics are a trending market nowadays in which automated solutions to monitor critical quality attributes (CQAs) have become essential to provide high quality treatments. Many automated CQA flow paths are either a combination of software and hardware that use micropipettes and well plates to accomplish chemistry.

Many companies have been successful at implementing compartments of CQA analysis. For example: companies such as MAST and Flownamics provide sample draw and clarification, however, cannot provide titer calculation/normalization or complete CQA analysis. These abomination systems must use multiple software and Application Programming Interfaces (APIs) to hand off the samples to an automated liquid handler (ALH), which exclusively uses pipette tips and well plates to conduct the CQA analysis. Moreover, the ALH used for titer (concentration) calculations, titer normalization, and CQA pre-treatment are typically different systems entirely. When software packages have to be glued together with APIs, even Window's updates, software package updates can completely break a functioning software integration. This adds to the overall complexity of the CQA analysis.

Liquid chromatography-mass spectrometry (LCMS) is an analytical chemistry technique that combines the physical separation capabilities of liquid chromatography (or HPLC) with the mass analysis capabilities of mass spectrometry (MS). The advantages of this technology are high analytical specificity and accuracy and flexibility in the development of reliable analytical methods. In contrast to gas chromatography mass spectrometry (GC-MS) as the traditional mass spectrometric technology in clinical chemistry. LC-MS/MS has been shown to be a robust technology, allowing its application also in a large scale routine laboratory setting.

Generally, LCMS is performed on sample types that are thermally unstable, polar, ionic or non-volatile, or on samples which are needed to be derivatized. Typical LCMS samples could include but are not limited to: nucleotides, peptides, steroids, hormones, dyes, fatty acids, humera, and alcohols. The application areas where LCMS is preferentially used is in the field of pharmacokinetics, proteomics, metabolomics, lipidomics, and drug development.

Generally, biological sample delivery for LCMS analysis requires multiple tools and equipment. Further, typically, the biological sample delivery for LCMS analysis require multiple steps/stages such as but not limited to: sample draw, sample purification, sample titer calculation, titer normalization, CQA pre-treatment and injection signal for LCMS. For instance, US20170082585A1 discloses a sample preparation and analysis system. The system includes a sample preparation system and a sample analysis system. The sample preparation system prepares samples in accordance with an assay that is selected from a database containing a plurality of unique assays. The sample analysis system includes an analyzer that is dynamically reconfigurable based on the selected assay so as to analyze the prepared sample in accordance with that selected assay. A data communication link communicates data from the sample preparation system to the sample analysis system to reconfigure the analyzer in accordance with the selected assay.

The existing solutions related to sample delivery for LCMS analysis are limited as they fail to provide a simple, easy-to-use, efficient and effective solution that provides real-time CQA analysis, as well as failing to provide a single system that is useful for sample draw, sample purification, sample titer calculation, titer normalization, CQA pre-treatment, and injection signal for the LCMS. Thus, the prior art solutions fail to disclose an efficient and effective system that can conduct multiple operations needed before the LCMS analysis.

In the light of the foregoing, there is a need for an efficient, multi-purpose, and effective solution that provides real-time CQA analysis. Thus, a single multipurpose sample delivery system is required that is useful for sample drawing, sample purification, sample titer calculation, titer normalization, CQA pre-treatment, and injection signal for the LCMS. Thus, broadly speaking, there is a need for a sample delivery system that can conduct multiple operations needed before the LCMS analysis.

SUMMARY

Embodiments of the present invention disclose an automated fluid handling system for handling a biological fluid sample prior to being delivered for liquid chromatography-mass spectrometry (LCMS) analysis comprising: An at least one inlet tube connected to a biological fluid sample source; a first multi-position selector valve fluidly connected to a hollow membrane fiber filter; wherein the first multi-position selector valve comprise at least one inlet port for fluidic connection with the inlet tube, a waste port and a plug; a second multi-position selector valve fluidly connected to a hollow membrane fiber filter; wherein the second multi-position selector valve comprise an at least one outlet port, a waste port and a plug; a plurality of syringe pumps fluidly connected to a hollow membrane fiber filter; wherein each of the plurality of syringe pumps is configured to aspire and dispense a fluid, at least one purification column fluidly connected to an outlet port of the second multi-position selector valve, a titer detection system fluidly connected to the purification column, wherein the titer detection system is configured to determine titer concentration value of biological fluid sample, and a pre-treatment unit to recapture the measured sample fluid coming from the titer detection system; wherein pre-treatment unit is configured to conduct the chemical pre-treatment prior to liquid chromatography-mass spectroscopy analysis.

In an embodiment, the biological fluid sample source includes a container.

In an embodiment, the first multi-position selector valve and the second position valve comprise a selector switch and a selector switch respectively.

In an embodiment, the automated fluid handling system comprises a plurality of control valves to regulate the flow of various fluids.

In an embodiment, the plurality of control valves are electronically controlled pinch valves.

In an embodiment, the automated fluid handling system comprises a waste sample collection reservoir.

In an embodiment, the automated fluid handling system comprises a cleaning solution reservoir.

In an embodiment, the second multi-position selector valve comprise an elution buffer port.

In an embodiment, the automated fluid handling system comprises an ethyl alcohol reservoir.

In an embodiment, the automated fluid handling system comprises an Ethylenediaminetetraacetic acid and peroxide mixture reservoir.

In an embodiment, each of the syringe pumps is electrically driven by a stepper motor.

In an embodiment, the titer detection system comprises either one of: RAMAN spectroscopy or Ultraviolet (UV) titer calculation system.

A method for handling biological fluid sample to be used for liquid chromatography-mass spectrometry analysis comprising the steps of: Drawing a biological fluid sample into a hollow membrane fiber filter by using a first syringe pump; Drawing a binding solution into the hollow membrane fiber filter by using a second syringe pump; Controlling both of the syringe pumps to aspirate and dispense at varying volumes, such that the biological fluid sample diffuses across the hollow membrane fiber filter and mixes with the binding solution, Passing the mixture of biological fluid sample and the binding solution to a purification column for biological fluid sample purification; thus achieving dynamic flow filtration of biological fluid sample; Cleaning the hollow membrane fiber filter by passing a cleaning solution through the hollow membrane fiber filter; Drawing an elution buffer into the purification column by using a second syringe pump for eluting the biological fluid sample mixture from the purification column; Delivering the biological fluid sample to a titer detection system for measuring titer concentration value of biological fluid sample; Delivering the biological fluid sample from the titer detection system to a pre-treatment unit for biological fluid sample pre-treatment required before liquid chromatography-mass spectrometry analysis.

In an embodiment, the method for handling biological fluid sample further comprising the additional step of cleaning the purification column by using strip buffer and equilibrating the purification column by using binding buffer.

In an embodiment, the method for handling biological fluid sample further comprising the additional step of cleaning the hollow membrane fiber filter using peroxide with Ethylenediaminetetraacetic acid (EDTA) solution.

In an embodiment, the method for handling biological fluid sample further comprising the additional step of cleaning the hollow membrane fiber filter using ethyl alcohol (EtOH) solution.

The present invention provides a single multipurpose sample delivery system that is useful for sample drawing, sample purification, sample titer calculation, titer normalization, CQA pre-treatment, and injection signal for the LCMS. These and other features and advantages of the present invention will become apparent from the detailed description below, in light of the accompanying drawings.

BRIEF DESCRIPTION OF THE DRAWINGS

FIG. 2 shows the automated fluid handling system of FIG. 1 in first step, illustrating drawing of a sample aseptically from a bioreactor;

FIG. 3 shows the automated fluid handling system of FIG. 1 in second step, illustrating passing of biological fluid sample through the hollow membrane fiber filter;

FIG. 4 shows the automated fluid handling system of FIG. 1 in third step, illustrating initiation of filtration of the biological fluid sample;

FIG. 5 shows the automated fluid handling system of FIG. 1 in fourth step, illustrating pushing of the mixture of biological fluid sample onto the purification column;

FIG. 6 shows the automated fluid handling system of FIG. 1 in Fifth step, illustrating dispensing action of the cleaning solution in the hollow membrane fiber filter;

FIG. 7 shows the automated fluid handling system of FIG. 1 in Sixth step, illustrating dispensing action of the 2% peroxide with 10 mM EDTA solution in the hollow membrane fiber filter;

FIG. 8 shows the automated fluid handling system of FIG. 1 in Seventh step, illustrating dispensing action of the 70% ethyl alcohol solution in the hollow membrane fiber filter;

FIG. 9 shows the automated fluid handling system of FIG. 1 in Eighth step, illustrating drawing of an elution buffer in a fluid line directed towards the hollow membrane fiber filter;

FIG. 10 shows the automated fluid handling system of FIG. 1 in Ninth step, illustrating elution off the biological fluid sample mixture from the purification column; and FIG. 11 shows the automated fluid handling system of FIG. 1 in Tenth step, illustrating recapturing of a measured biological fluid sample in the pre-treatment unit.

DETAILED DESCRIPTION

Before describing the present invention in detail, it should be observed that the present invention utilizes a combination of components or processes. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "one example", "an example", "another example" and so forth, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items. It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced items.

The automated fluid handling system will now be described with reference to the accompanying drawings, particularly FIGS. 1-11.

Figure 1:
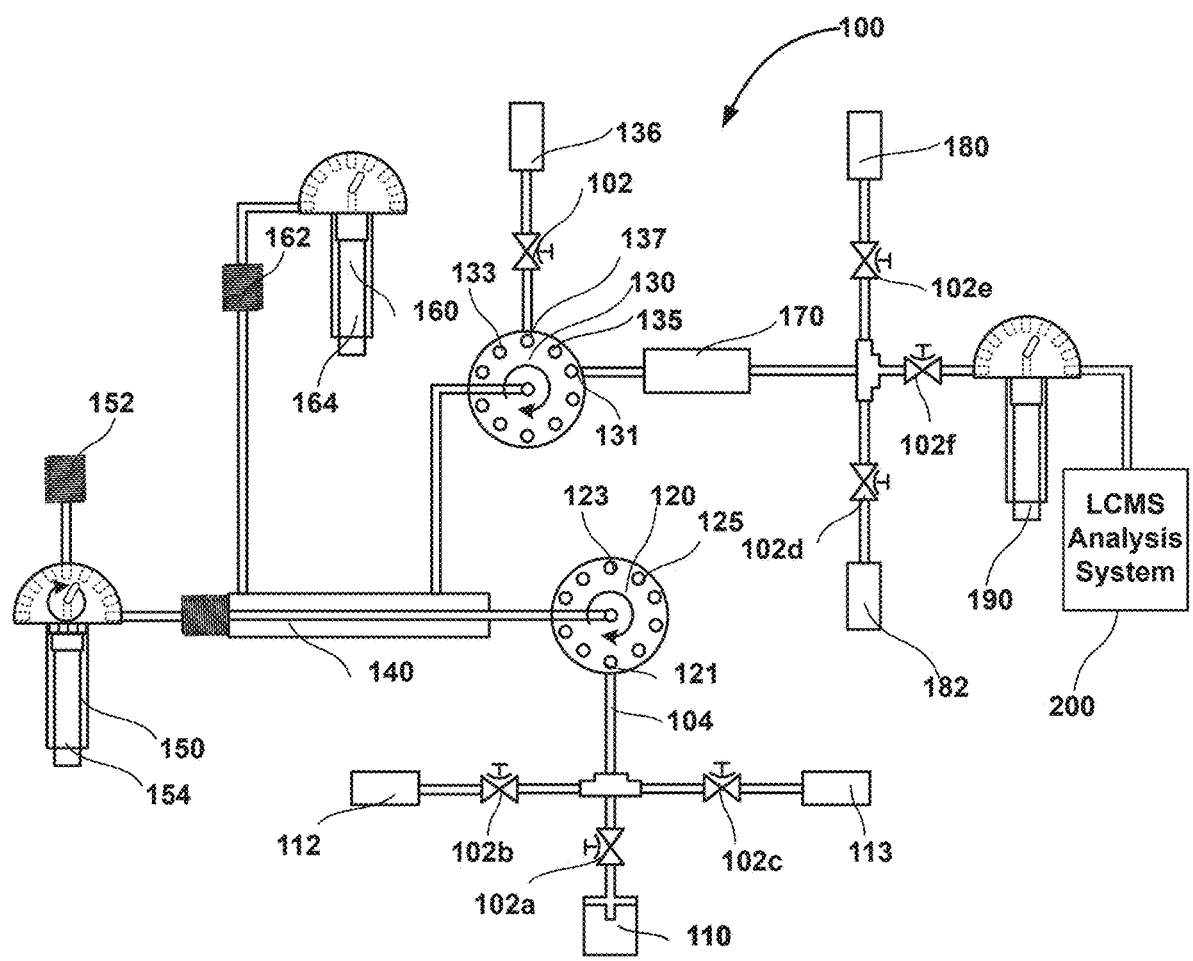
FIG. 1 shows a schematic diagram of an automated fluid handling system, according to an embodiment of the invention.

FIG. 1 illustrates an automated fluid handling system 100 for handling biological fluid sample according to an embodiment of the present invention, wherein the biological fluid sample is configured to be delivered later for liquid chromatography-mass spectrometry analysis. The automated fluid handling system 100 comprises an inlet tube 104 connected to a biological fluid sample source 110. In an embodiment as shown in FIG. 1, the biological fluid sample source 110 is a container 110 (bioreactor) for storing a biological fluid sample such as but not limited to: monoclonal antibodies, fusion proteins, biotherapeutics (such as Humera/humira), other medical drugs and so forth. In another embodiments (not shown in figures), the biological fluid sample source 110 could include but is not limited to: vials, syringes, test kits, injections, bottles, or other fluid storing equipment, and so forth. Although in FIG. 1, only a single container 110 for storing a biological fluid sample is shown for sake of simplicity, in various other embodiments (not shown in figures) the number of container 110 could be more than one. Thus, the number of inlet tubes 104 could be more than one.

The automated fluid handling system 100 further comprises a plurality of control valves 102 to regulate flow of various fluids. The plurality of control valves 102 could be designated as control valve 102a, control valve 102b, control valve 102c, control valve 102d control valve 102e, control valve 102f, and so forth. The plurality of control valves 102 could be any valve capable of regulating and/or blocking the flow of fluid and the plurality of control valves 102 could include but not limited to: pinch valve, one-way valve, needle valve, and so forth. The fluid(s) could be either: biological fluid sample, binding solution, cleaning solution, elution buffer and/or combinations/mixture of the above thereof. As will be described in greater detail below, the exemplary automated fluid handling system 100 is particularly designed to perform multiple laboratory functions, i.e., sample drawing, sample purification/filtering, concentration of sample, calculation of titer or concentration, normalization into acceptable ranges, and critical quality attributes (CQA) sample pre-treatment, in combination in an automated system.

A first multi-position selector valve 120 is fluidly connected to a hollow membrane fiber filter 140 which will be described in greater detail in the below description. The first multi-position selector valve 120 comprise at least one inlet port 121, a waste port 123 and a plug 125. As seen in FIG. 1, the number of inlet ports 121 is more than one. Each inlet port 121 is fluidly connected to the container 110 with a control valve 102 interposed in-between to regulate flow of biological fluid sample from the container 110. The first multi-position selector valve 120 further comprises a first selector switch 122 (FIGS. 2-11) designated by a symbol "star". The position of the first selector switch 122 can be selectively changed depending on the step (stage) of the automated fluid handling system 100. For instance, when the first selector switch 122 is positioned on top of one of the inlet ports 121, then the first multi-position selector valve 120 fluidly connects the fluid line of the particular inlet port 121 to the fluid line of the hollow membrane fiber filter 140. When the first selector switch 122 is positioned on top of waste port 123, then the first multi-position selector valve 120 fluidly connects the fluid line of the waste port 123 to the fluid line of the hollow membrane fiber filter 140, thus effectively dispensing all fluid of fluid line of the hollow membrane fiber filter 140 to a wastage collection facility. When the first selector switch 122 is positioned on top of plug 125, then the first multi-position selector valve 120 blocks fluid communication of the fluid line of the hollow membrane fiber filter 140 to any other fluid line(s) coupled with first multi-position selector valve 120.

A second multi-position selector valve 130 is fluidly connected to a hollow membrane fiber filter 140 which will be described in greater detail in the below description. The second multi-position selector valve 130 comprise at least one outlet port 131, a waste port 133, a plug 135, and an elution buffer port 137. As seen in FIG. 1, the number of inlet ports 121 is more than one. Each outlet port 131 is fluidly connected to a purification column 170. As shown in FIG. 1, a single purification column 170 is shown for sake of simplicity. However, the number of purification columns 170 could be more than one in various other embodiments (not shown in figures). The elution buffer port 137 is fluidly connected to an elution buffer reservoir 136 with a control valve 102 interposed in-between to regulate flow of biological fluid sample from the elution buffer reservoir 136. The second multi-position selector valve 130 further comprise a second selector switch 132 (FIGS. 2-11) designated by the symbol "star". The position of the second selector switch 132 can be changed depending on the step (stage) of the automated fluid handling system 100. For instance, when the second selector switch 132 is positioned on top of one of the outlet ports 131, then the second multi-position selector valve 130 fluidly connects the fluid line of the particular outlet port 131 to the fluid line of the hollow membrane fiber filter 140. When the second selector switch 132 is positioned on top of waste port 133, then the second multi-position selector valve 130 fluidly connects the fluid line of the waste port 133 to the fluid line of the hollow membrane fiber filter 140, thus effectively dispensing all fluid of fluid line of the hollow membrane fiber filter 140 to a wastage collection facility. When the second selector switch 132 is positioned on top of plug 135, then the second multi-position selector valve 130 blocks fluid communication of the fluid line of the hollow membrane fiber filter 140 to any other fluid line(s) coupled with the second multi-position selector valve 130. When the second selector switch 132 is positioned on top of elution buffer port 137, then the second multi-position selector valve 130 fluidly connects the fluid line of the elution buffer reservoir 136 to the fluid line of the hollow membrane fiber filter 140.

Two syringe pumps 150, 160 are fluidly connected to a hollow membrane fiber filter 140; wherein each of the plurality of syringe pumps 150, 160 is configured to aspire and dispense a fluid. One of the syringe pumps is designated as the "First syringe pump 150" and the remaining syringe pump is designated as the "second syringe pump 160", wherein both of the syringe pumps can collectively be referred to as "syringe pumps 150, 160". The syringe pumps 150, 160 are configured to be fluidly connected to various fluid sources such as but not limited to: water, air, ethyl alcohol, 70 mM Tris base with 50 mM acetic acid, NaOH (sodium hydroxide), and so forth to dispense various fluids in the hollow membrane fiber filter 140. The syringe pumps 150, 160 further comprises a waste port for aspirating various fluids from the hollow membrane fiber filter 140. Each of the syringe pumps 150, 160 comprises a holding coil 152, 162 of 1 mm (millimeter). Each of the syringe pumps 150, 160 is electrically driven by a stepper motor (not shown in figures). The stepper motor (not shown in figures) guides a reciprocating shaft (154, 164) of the syringe pumps 150, 160 back and forth, wherein each step on the stepper motor (not shown in figures) corresponds to a certain volume of fluid. Thus, the syringe pumps 150, 160 are configured to dispense precise amounts of fluid controlled electrically by stepper motors (not shown in figures).

In an embodiment, both of the syringe pumps 150, 160 i.e. the first syringe pump 150 and the second syringe pump 160 are identical and comprises similar components with little to no variation except the difference in the positional arrangement and fluids aspirated/dispensed using the syringe pumps 150, 160.

A purification column 170 is fluidly connected to an outlet port 131 of the second multi-position selector valve 120. The purification column 170 is configured to filter the fluid as well as for concentrating the biological fluid sample in the purification column 170. In an exemplary embodiment, the purification column 170 is a Protein A column configured for the purification of antibodies from complex mixtures such as but not limited to: serum, ascites, and hybridoma culture media and so forth. The resin material for the purification column 170 could include but not limited to: agarose, dextran, cellulose, and polyacrylamide and so forth.

A titer detection system 180 is fluidly connected to the purification column 170, wherein the titer detection system 180 is configured to determine titer concentration value of biological fluid sample. The titer detection system 180 could include but not limited to: RAMAN spectroscopy, Ultraviolet (UV) titer calculation system and so forth. A pre-treatment unit 190 is configured to recapture the measured biological fluid sample and conducts the required chemical pre-treatment prior to liquid chromatography-mass spectroscopy (LCMS) analysis. The pre-treatment unit 190 utilizes conventionally known concepts/techniques/instrumentation already known in prior art depending upon the biological fluid sample. The conventionally known concepts/techniques/instrumentation of the pre-treatment unit 190 could include but not limited to: Solid phase extraction (SPE), Solid supported liquid-liquid extraction (SLE), Protein precipitation (PPE), Desalting, Isoelectric point precipitation, Organic solvent extraction and Ion exchange chromatography and so forth. The pre-treatment unit 190 conduct further experiments such as but not limited to: titer normalization and so forth.

In an exemplary embodiment of the present invention, after protein concentration is analyzed in Ultraviolet (UV) titer calculation system 180, protein is recaptured in the pre-treatment unit 190 to conduct further experiments such as protein normalization to get protein concentration to a certain value (usually 2.0 mg/ml).

As shown in FIG. 1, the automated fluid handling system 100 further comprises a waste sample collection reservoir 182, a cleaning solution reservoir (not shown in figures), and an elution buffer reservoir 136. The cleaning solution(s) of the cleaning solution reservoir (not shown in figures) could include but not limited to: ethyl alcohol, Ethylenediamine tetra-acetic acid (EDTA), various peroxides, sodium hydroxide (NaOH), water and so forth. The elution buffer of the elution buffer reservoir 136 could include but not limited to: 70 mM Tris base with 50 mM acetic acid, pH 2.5-3.0 and so forth. the pH level of the elution buffer is significantly lower (more acidic) than the pH level of the binding solution to ensure biological fluid sample (humira, for instance) is eluted off (fall off/washed off) from the purification column 170. In an embodiment, the binding solution could include but not limited to: 70 mM Tris base with 50 mM acetic acid, pH 7.4 and so forth. The higher pH level of the binding solution ensures that the biological fluid sample (humira, for instance) binds (sticks) to the Purification column 170.

The hollow membrane fiber filter 140 is configured to act as a selective membrane to remove particles from the fluid based on their size. The membrane surfaces comprises fine pores (not shown in figures) that determine which particles will pass through based on a molecular weight cut-off value. The semi-permeable barrier of the hollow membrane fiber filter 140 is in the form of a hollow fiber. The material for hollow membrane fiber filter 140 could include but not limited to: cellulose and synthetic polymers and so forth. The hollow membrane fiber filter 140, the purification column 170 and the two syringe pumps 150, 160 are configured to enable dynamic fiber filtration of the biological fluid sample. Dynamic fiber filtration is a technique that combines biological fluid sample draw, biological fluid sample filtration and biological fluid sample purification in one flow path. The porosity size of hollow membrane fiber filter 140 could vary depending upon the area of application. In an embodiment as seen in FIG. 1, the 0.65 micron particle size of hollow membrane fiber filter 140 is used for the biological fluid samples such as but not limited to monoclonal antibodies, Humira and fusion proteins.

In another embodiment (not shown in figures), the micron particle size of hollow membrane fiber filter 140 could vary from 0.65 microns to 0.22 microns depending on the area of application.

FIGS. 2-11 in general illustrate various steps of functionality of the automated fluid handling system 100, according to an exemplary method of the present invention.

Figure 2:
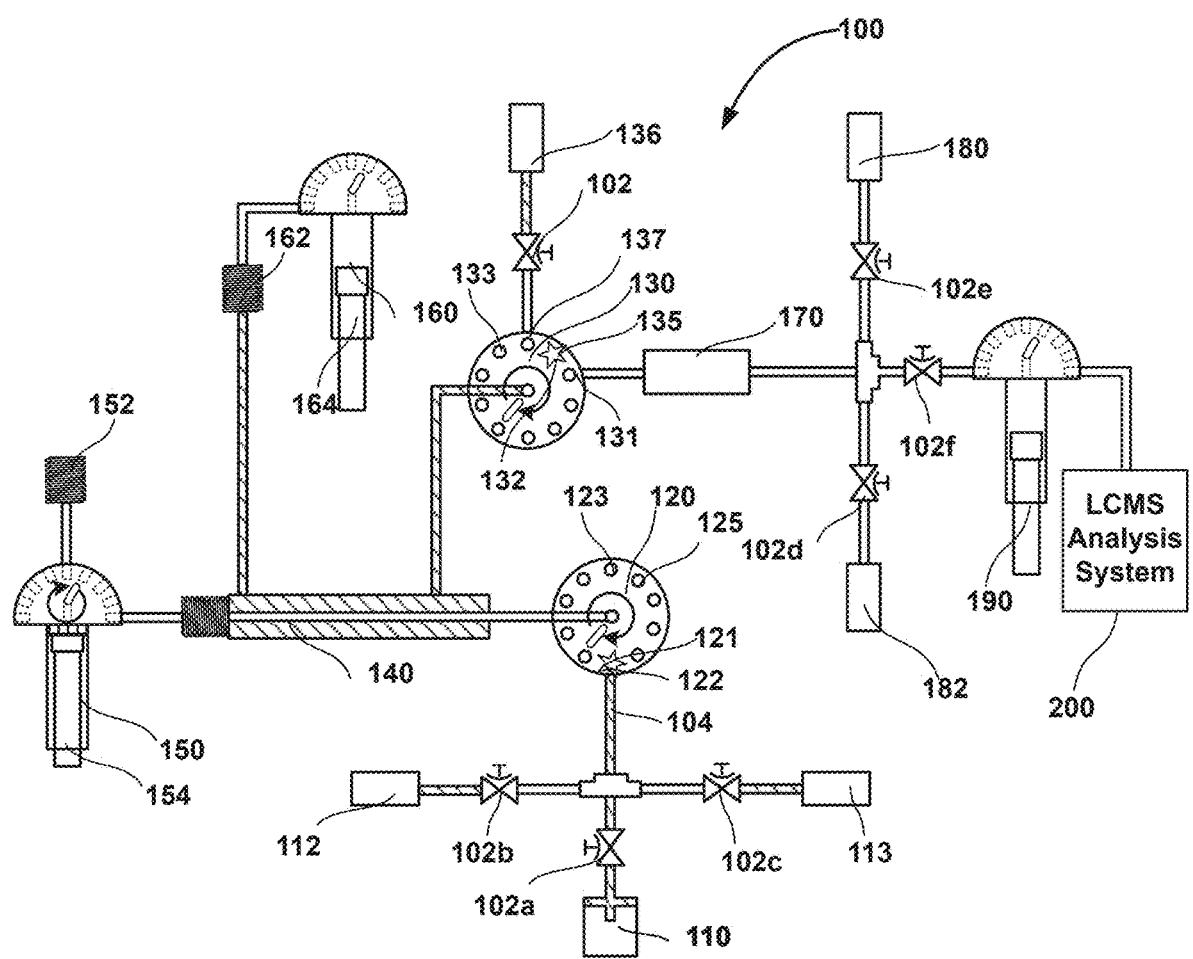
FIGS. 2-11 in general illustrate various steps of the functionality of the automated fluid handling system.

Initially, all control valves 102 (that is 102a, 102b, 102c, 102d, 102e, 102f, and so forth) are kept in an activated state, thereby blocking fluid communication through the control valves 102. As shown in FIG. 2, firstly, a biological fluid sample is drawn from the container 110 through the inlet tube 104 by de-activating a control valve 102a. As shown in FIG. 2, the first selector switch 122 (dial/button) designated by the symbol "star" of the first multi-position selector valve 120 is positioned on top of inlet port 121. Further, a binding solution such as but not limited to: 70 mM Tris base with 50 mM acetic acid, pH 7.4 and so forth is drawn into the hollow membrane fiber filter 140 using a second syringe pump 160. As shown in FIG. 2, the second selector switch 132 (dial/button) designated by symbol "star" of the second multi-position selector valve 130 is positioned on plug 135.

Figure 3:
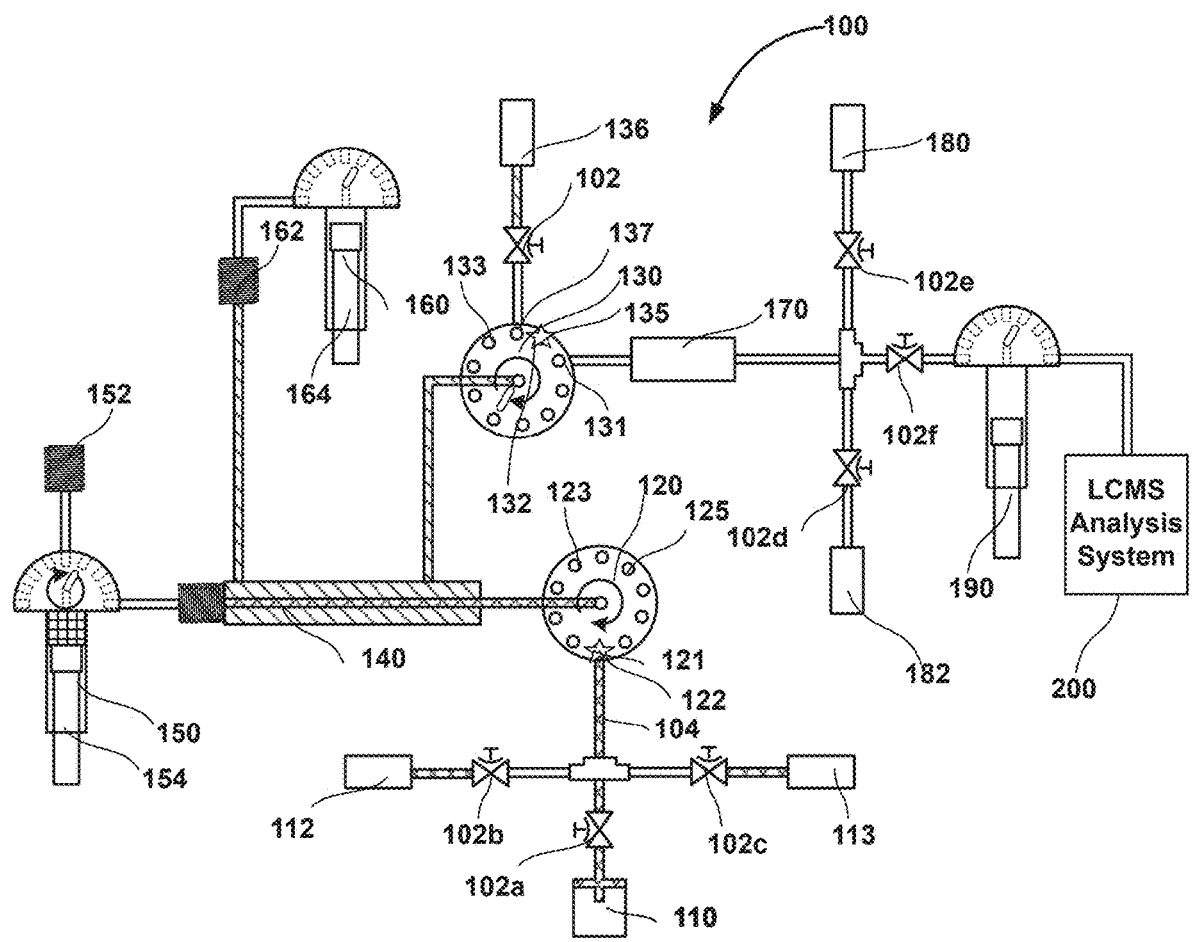

Afterwards, as shown in FIG. 3, the biological fluid sample passes through the hollow membrane fiber filter 140 by using the first syringe pump 150.

Figure 4:
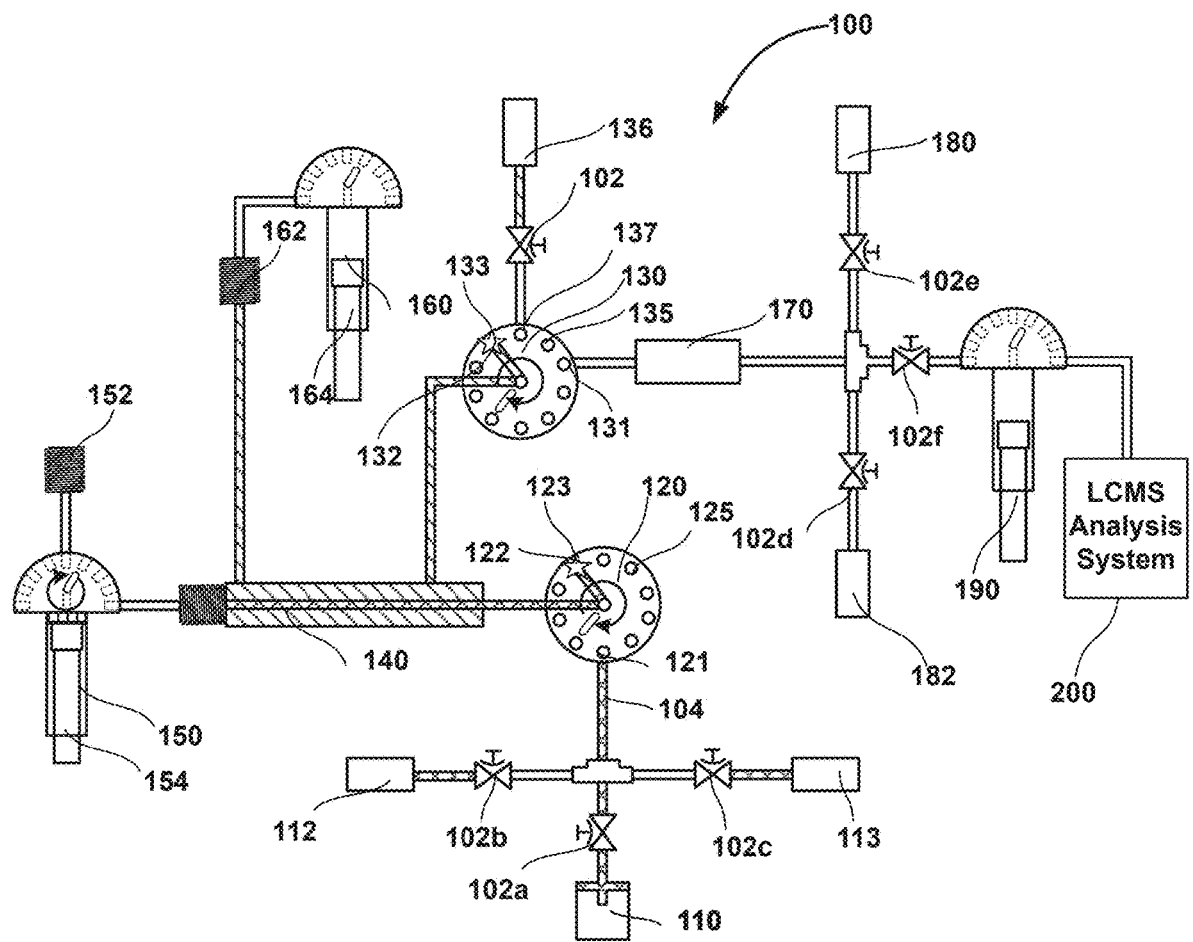

Afterward, the control valve 102a is re-activated to maintain sterile barrier. As shown in FIG. 4, the first selector switch 122 (dial/button) of the first multi-position selector valve 120 is now selectively positioned on top of waste port 123 and the second selector switch 132 (dial/button) of the second multi-position selector valve 130 is now selectively positioned on waste port 133.

When both the first multi-position selector valve 120 and the second multi-position selector valve 130 are put on the "waste port" position using first selector switch 122 and second selector switch 132 respectively FIG. 4, the filtration of the biological fluid sample can be initiated. Both of the syringe pumps 150, 160 are commanded to aspirate and dispense at varying volumes, thus achieving dynamic flow filtration of the biological fluid sample. Fluid flows from/to the syringe pumps 150, 160 can be static, reversed or parallel depending on the requirement of the filtration operation. Depending on the intensity of the filtration force required, the automated fluid handling system 100 adjusts to compensate for various parameters associated with the filtration process and/or syringe pumps 150, 160. The biological fluid sample diffuses across the hollow membrane fiber filter 140 and slowly combines with the binding solution (permeate) as the syringe pumps 150, 160 are dynamically controlled to achieve maximum filtering. Depending on the biological fluid sample viscosity and sediment/cell concentration, the syringe pumps 150, 160 are adjusted to both clean and filter at an efficient rate. The process is continued for a predetermined number of oscillations of both syringe pumps 150, 160 until the biological fluid sample filtration is completed.

Figure 5:
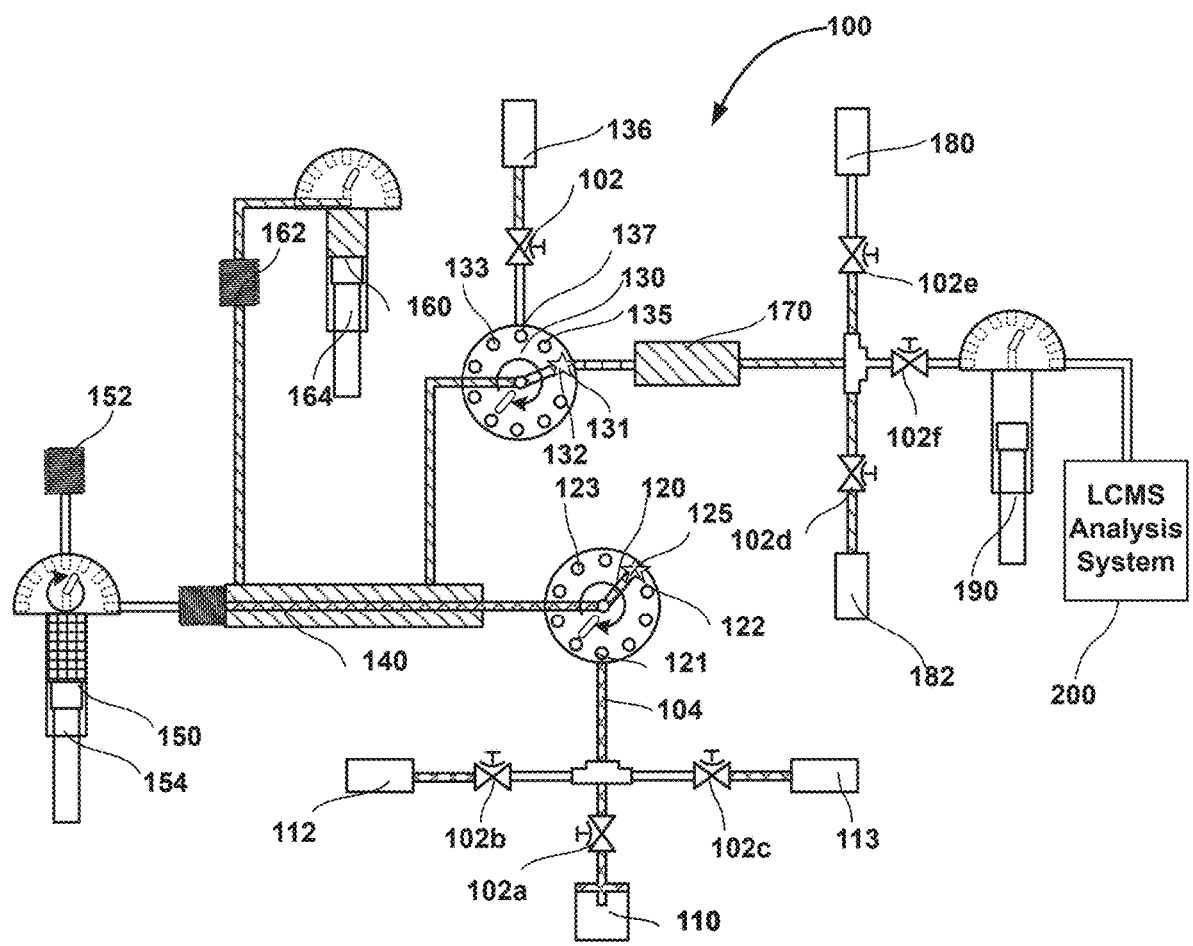

Afterward, as shown in FIG. 5, the first selector switch 122 (dial/button) of the first multi-position selector valve 120 is now selectively positioned on top of plug 125, and the second selector switch 132 (dial/button) of the second multi-position selector valve 130 is now selectively positioned on an outlet port 131. The second syringe pump 160 is dynamically controlled to dispense binding solution towards the hollow membrane fiber filter 140 to push the mixture of biological fluid sample onto the purification column 170 for further analysis. Wherein the purification column 170 filter/purifies the mixture of biological fluid sample and/or increases concentration of the biological fluid sample in the purification column 170. The waste (excess) fluid left out after purification of the mixture of biological fluid sample passes through the waste sample collection reservoir 182 by deactivating control valve 102d positioned between the waste sample collection reservoir 182 and the purification column 170.

Figure 6:
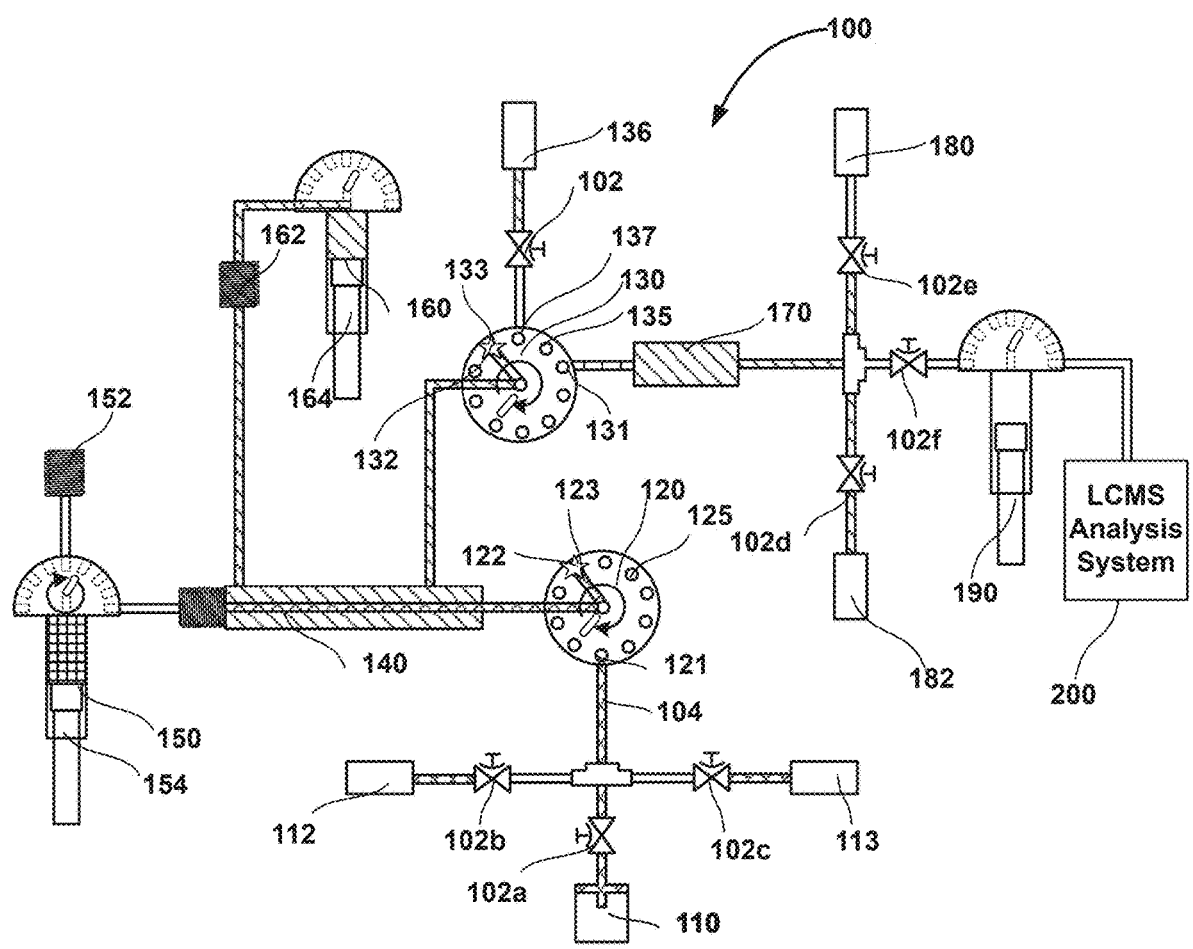

Once the biological fluid sample is purified on the purification column 170, the hollow membrane fiber filter 140 needs to be cleaned. Afterward, as shown in FIG. 6, the first selector switch 122 (dial/button) of the first multi-position selector valve 120 is selectively positioned on top of waste port 123 and the second selector switch 132 (dial/button) of the second multi-position selector valve 130 is selectively positioned on a waste port 133. Afterward, a cleaning solution is drawn into the syringe from the syringe ports of both syringe pumps 150, 160. The dispensing action of the cleaning solution in the hollow membrane fiber filter 140 pushes all left over biological fluid sample mixture residing in the hollow membrane fiber filter 140 and associated fluid lines to the waste collection facility (not shown in figures) connected to waste ports 123, 133.

Figure 7:
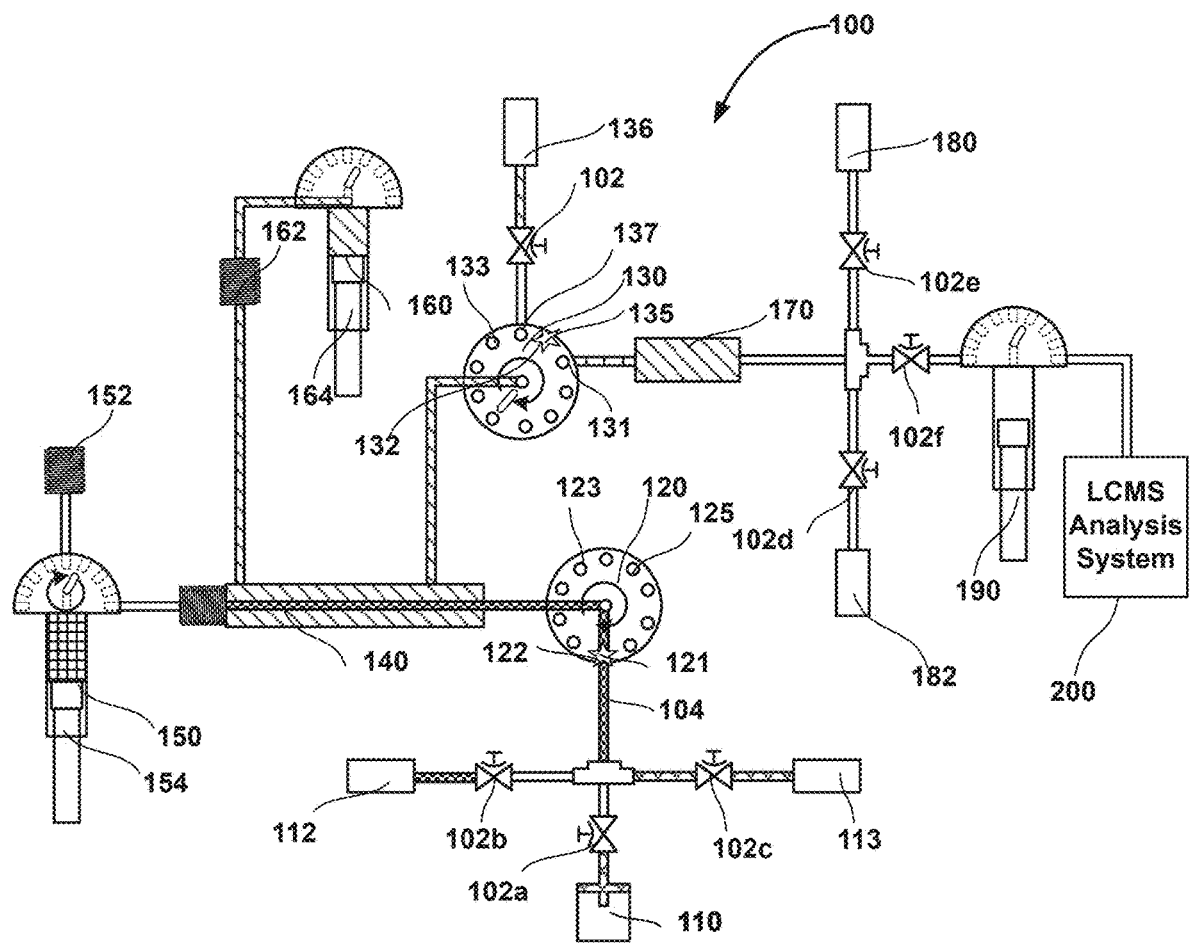

Afterward, as shown in FIG. 7, the first selector switch 122 (dial/button) of the first multi-position selector valve 120 is now selectively positioned on top of inlet port 121 and the second selector switch 132 (dial/button) of the second multi-position selector valve 130 is now selectively positioned on a plug 135. Afterward, as shown in FIG. 7, the control valve 102c is de-activated to enable fluid flow (2% peroxide with 10 mM EDTA) from the ethylenediaminetetraacetic acid (EDTA) and peroxide mixture reservoir 113. The residual biological fluid sample and the 2% peroxide with 10 mM EDTA solution is drawn aseptically through the control valve 102c towards the hollow membrane fiber filter 140 by using first syringe pump 150.

Figure 8:
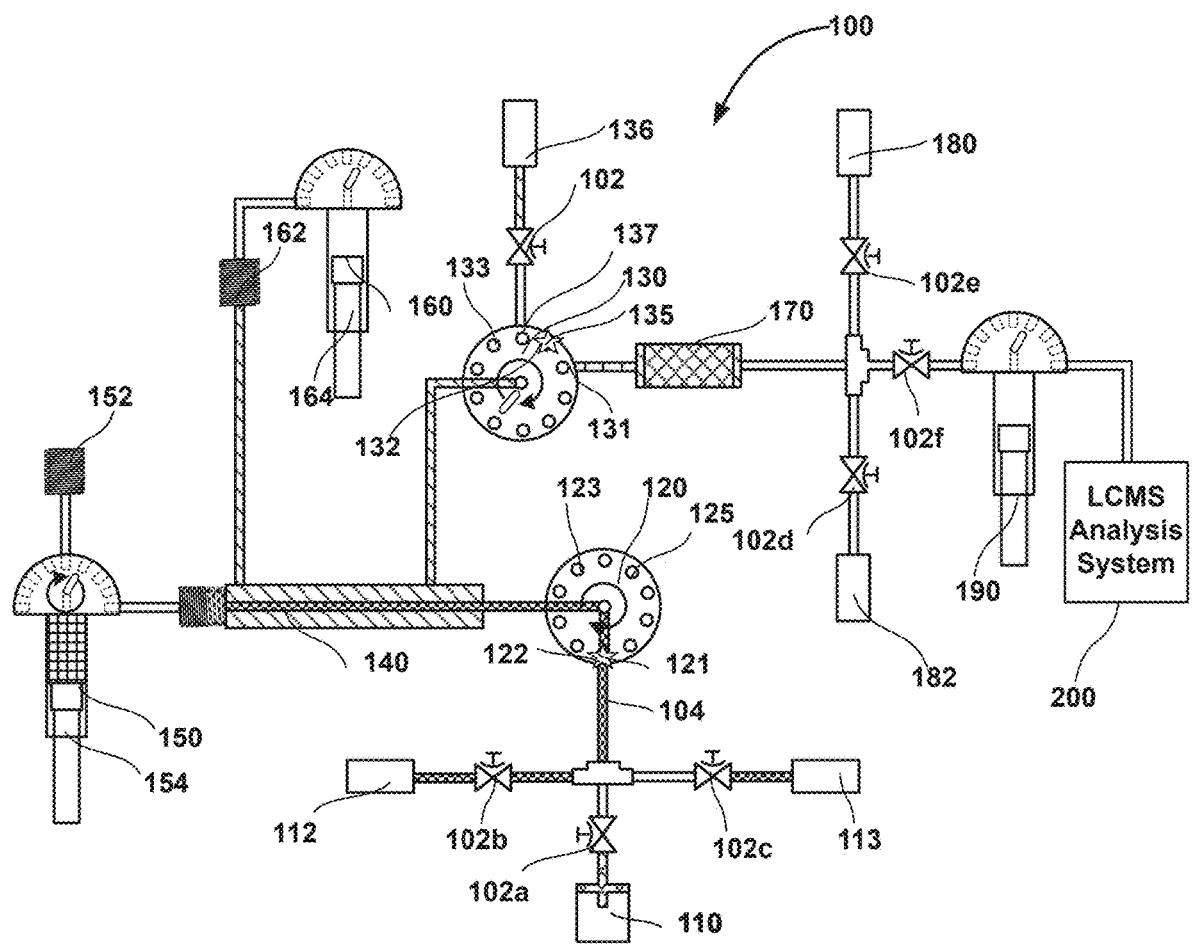

After cleaning of hollow membrane fiber filter 140 using 2% peroxide with 10 mM EDTA solution is achieved, the 2% peroxide with 10 mM EDTA control valve 102c is re-activated as shown in FIG. 8. Afterward, as shown in FIG. 8, the control valve 102b is de-activated to enable fluid flow (70% ethyl alcohol) from the ethyl alcohol reservoir 112. The residual biological fluid sample and the 70% ethyl alcohol solution is drawn aseptically through the control valve 102b towards the hollow membrane fiber filter 140 by using first syringe pump 150 for further sterilization.

Figure 9:
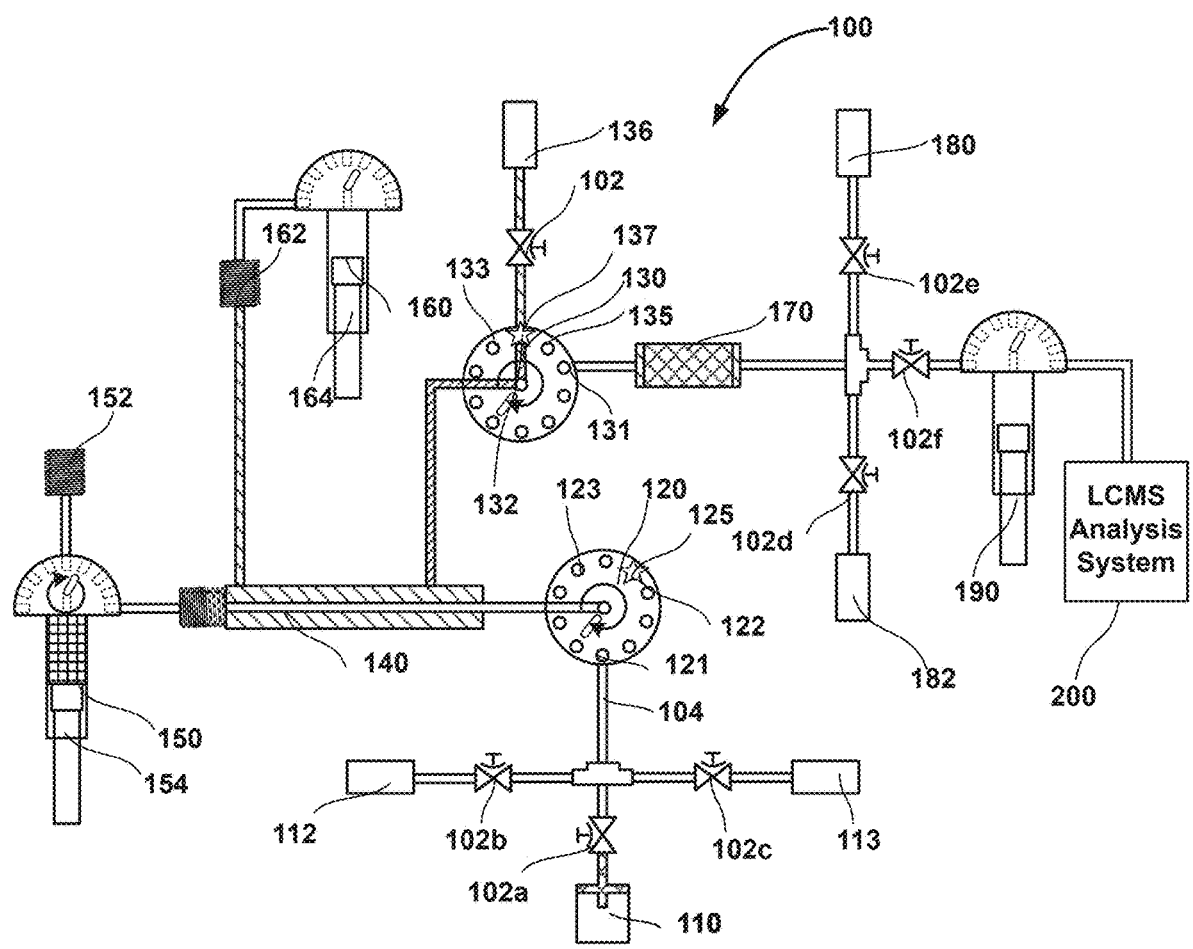

Afterward, as shown in FIG. 9, the first selector switch 122 (dial/button) of the first multi-position selector valve 120 is now selectively positioned on top of plug 125, and the second selector switch 132 (dial/button) of the second multi-position selector valve 130 is now selectively positioned on an elution buffer port 137. The elution buffer from the elution buffer reservoir 136 is drawn in a fluid line directed towards the hollow membrane fiber filter 140 using second syringe pump 160 and by activating control valve 102 interposed between the elution buffer port 137 and the elution buffer reservoir 136.

Figure 10:
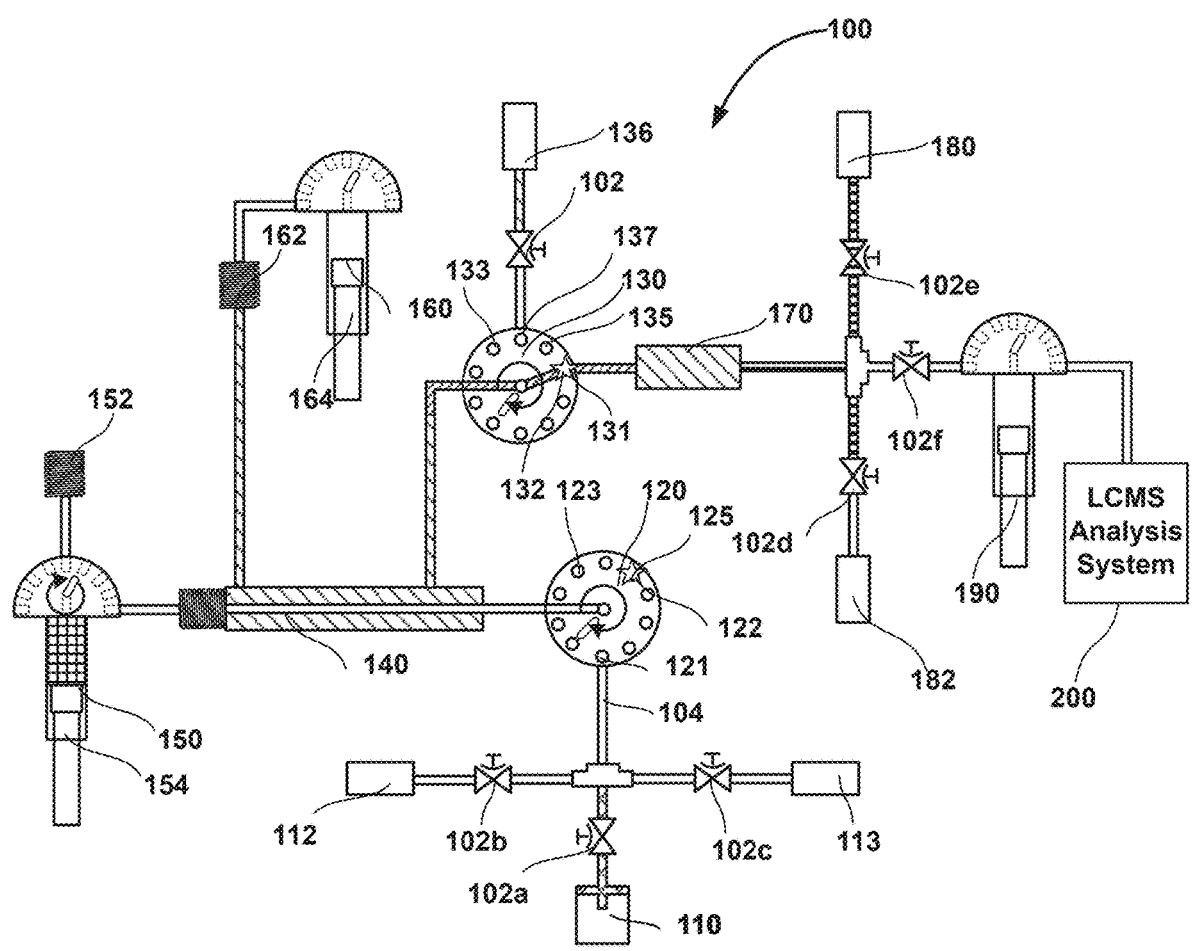

Afterward, as shown in FIG. 10, the second selector switch 132 (dial/button) of the second multi-position selector valve 130 is now selectively positioned on an outlet port 133. The elution buffer from the elution buffer reservoir 136 is now pushed towards the purification column 170 using a second syringe pump 160. The biological fluid sample mixture is eluted off (washed off) from the purification column 170 and then, the eluted biological fluid sample is delivered to a titer detection system 180 for measuring titer concentration value of biological fluid sample by de-activating control valve 102e positioned between the purification column 170 and the titer detection system 180.

Figure 11:
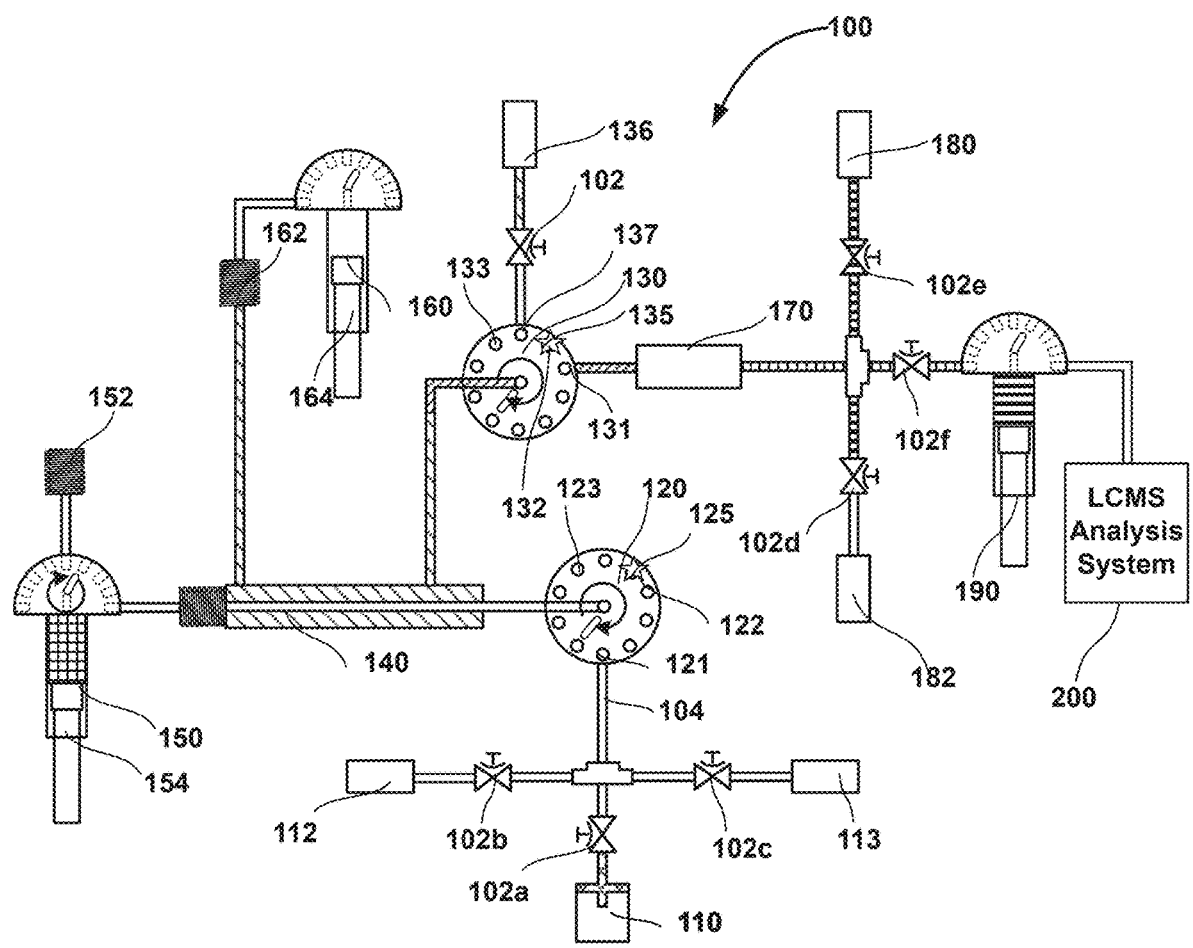

After the biological fluid sample has been eluted off (washed off) from the purification column 170, the second selector switch 132 (dial/button) of the second multiposition selector valve 130 is now selectively positioned on top of a plug 135 as shown in FIG. 11. Afterwards, the pre-treatment unit 190 recaptures the measured biological fluid sample from the titer detection system 180 by deactivating control valve 102f positioned between the pre-treatment unit 190 and the titer detection system 180.

Afterwards, the pretreatment unit 190 conducts the required chemical pre-treatment and/or required experiments prior to liquid chromatography-mass spectroscopy (LCMS) analysis. Afterwards, the pretreated biological fluid sample is injected into an liquid chromatography-mass spectroscopy (LCMS) analysis system 200. Afterwards, the purification column 170 is also cleaned with strip buffer (not shown in figures) and equilibrated with binding buffer (not shown in figures).

It should be obvious to the one skilled in the art that the various embodiments of automated fluid handling system 100 could be used interchangeably with little to no variation. Further, it should be obvious to the one skilled in the art that the various steps for utilizing the automated fluid handling system 100 as shown in FIGS. 2-11 are merely exemplary and are not limited, and thus the automated fluid handling system 100 could be utilized by either: adding few additional steps other than steps shown in FIGS. 1-11, removing (skipping) a few steps shown in FIGS. 1-11 or by modifying a few steps shown in FIGS. 1-11. Further, it should be understood that the automated fluid handling system 100 could utilize any other composition (chemical formula) of the binding solution, cleaning solution, and elution buffer for handling biological fluid sample depending on the requirement of the biological fluid sample. Further, it should be understood that the quantity (amount) of the binding solution, cleaning solution, and elution buffer for handling biological fluid sample could vary depending on the requirement of the biological fluid sample. Broadly speaking, the type of material (for instance: cleaning fluid) used in the automated fluid handling system 100 as well as the quantity of material used in the automated fluid handling system 100 is not a limiting factor in the various embodiments of automated fluid handling system 100.

An exemplary method for handling biological fluid sample to be used for liquid chromatography-mass spectrometry analysis will now be described in reference to FIGS. 1-11. The method for handling biological fluid sample to be used for liquid chromatography-mass spectrometry analysis involves steps of:

Drawing a biological fluid sample into a hollow membrane fiber filter 140 by using a first syringe pump 150; Drawing a binding solution into the hollow membrane fiber filter 140 by using a second syringe pump 160; Controlling both of the first syringe pump 150 and second syringe pump 160 to aspirate and dispense at varying volumes, such that the biological fluid sample diffuses across the hollow membrane fiber filter 140 and mixes with the binding solution, and further passing the mixture of biological fluid sample and the binding solution to a purification column 170 for biological fluid sample purification; thus achieving dynamic flow filtration of biological fluid sample; Cleaning the hollow membrane fiber filter 140 by passing a cleaning solution through the hollow membrane fiber filter 140; Drawing an elution buffer into the purification column 170 by using a second syringe pump 160 for eluting the biological fluid sample mixture from the purification column 170; Delivering the biological fluid sample to a titer detection system 180 for measuring titer concentration value of biological fluid sample; and Delivering the biological fluid sample from the titer detection system 180 to a pre-treatment unit 190 for biological fluid sample pre-treatment required before liquid chromatography-mass spectrometry analysis.

It should be understood that the term "fluid" is a broad term and it could include any flowable media in the automated fluid handling system 100. The "fluid" could include either one of: biological fluid sample, buffer solution, cleaning solution, elution buffer, Ethylenediaminetetraacetic acid (EDTA) and peroxide mixture, ethyl alcohol solution, chemicals. Further, the "fluid" could be mixture/combination of at least two flowable mediums (for instance: mixture of biological fluid sample and buffer solution) and so forth, depending on the context. Further, the term "fluid line" or "fluid lines" is a broad term and it could include any tubing/piping capable of transporting fluids from one place to another, depending on the context.

As seen in FIGS. 1-11, the automated fluid handling system 100 according to various embodiments of present invention is used for biological fluid sample. However, the automated fluid handling system 100 could also be used in other areas of application such as but not limited to: sewerage industry, medical industry, food industry, water treatment/purification, waste treatment, factories, viral infection detection, chemical preparation so forth. For instance, the automated fluid handling system 100 could be configured for handling various fluids by varying dimensions/material of the hollow membrane fiber filter 140, varying raisin material/size of the purification column 170 and so forth.

As seen in FIGS. 1-11, the automated fluid handling system 100 according to various embodiments of present invention is controlled by an electric control unit (not shown in figures) which could utilizes various software/algorithms/APIs known in prior art such as but not limited to: SIAsoft (Software) with PYTHON programming interface. Further, the electric control unit could utilize various other control arrangements such as but not limited to: sensors, motors, printed circuit board (PCB), circuitry module, and so forth. In addition, or alternatively, the circuitry module may be used to actively record computer-readable data or other information pertaining to the module, including module history information, wherein such information is downloadable by or transferable to external apparatus through a standard interface, such as a USB port. Electrical or electronic connectors may be employed to provide power to the electric control unit.

In an embodiment (not shown in figures), the electric control unit (not shown in figures) could include manual override interface in the form of a keyboard/joystick to enable manual control of the automated fluid handling system 100 by an operating personnel such as a lab technician.

Although particular embodiments of the invention have been described in detail for purposes of illustration, various modifications and enhancements may be made without departing from the spirit and scope of the invention.

What is claimed is:

1. An automated fluid handling system (100) for handling a biological fluid sample prior to being delivered for liquid chromatography-mass spectrometry (LCMS) analysis, comprising:
    at least one inlet tube (104) connected to a biological fluid sample source (110);
    a first multi-position selector valve (120) fluidly connected to a hollow membrane fiber filter (140); wherein the first multi-position selector valve (120) comprises at least one inlet port (121) for fluidic connection with the inlet tube (104), a waste port (123) and a plug (125);
    a second multi-position selector valve (130) fluidly connected to a hollow membrane fiber filter (140), wherein the second multi-position selector valve (130) comprises at least one outlet port (131), a waste port (133), and a plug (135);
    a plurality of syringe pumps (150,160) fluidly connected to a hollow membrane fiber filter (140); wherein each of the plurality of syringe pumps (150, 160) is configured to aspire and dispense a fluid;
    at least one purification column (170) fluidly connected to an outlet port (131) of the second multi-position selector valve (120);
    a titer detection system (180) fluidly connected to the purification column (170), wherein the titer detection system (180) is configured to determine titer concentration value of the biological fluid sample; and
    a pre-treatment unit (190) to recapture the measured biological fluid sample coming from the titer detection system (180); wherein the pre-treatment unit (190) is configured to conduct chemical pre-treatment on the measured biological on the biological sample fluid prior to liquid chromatography-mass spectroscopy analysis.

2. The automated fluid handling system (100) of claim 1, wherein the biological fluid sample source (110) includes a container (110).

3. The automated fluid handling system (100) of claim 1, wherein the first multi-position selector valve (120) and the second position valve (130) comprise a first selector switch (122) and a second selector switch (132) respectively.

4. The automated fluid handling system (100) of claim 1, wherein the automated fluid handling system (100) comprises a plurality of control valves (102) to regulate the flow of various fluids.

5. The automated fluid handling system (100) of claim 1 wherein the plurality of control valves (102) are electronically controlled pinch valves.

6. The automated fluid handling system (100) of claim 1, wherein the automated fluid handling system (100) comprises a waste sample collection reservoir (182).

7. The automated fluid handling system (100) of claim 1, wherein the automated fluid handling system (100) comprises a cleaning solution reservoir.

8. The automated fluid handling system (100) of claim 1, wherein the second multi-position selector valve (130) comprises an elution buffer port (137).

9. The automated fluid handling system (100) of claim 1, wherein the automated fluid handling system (100) comprises an ethyl alcohol reservoir (112).

10. The automated fluid handling system (100) of claim 1, wherein the automated fluid handling system (100) comprises an Ethylenediaminetetraacetic acid and peroxide mixture reservoir (113).

11. The automated fluid handling system (100) of claim 1, wherein each of the syringe pumps (150,160) is electrically driven by a stepper motor.

12. The automated fluid handling system (100) of claim 1, wherein the titer detection system (180) comprises at least one of: RAMAN spectroscopy, and Ultraviolet (UV) titer calculation system.

13. A method for handling a biological fluid sample to be used for liquid chromatography-mass spectrometry analysis, the method comprising the steps of:
- drawing the biological fluid sample into a hollow membrane fiber filter (140) by using a first syringe pump (150);
- drawing a binding solution into the hollow membrane fiber filter (140) by using a second syringe pump (160);
- controlling both first syringe pump (150) and second syringe pump (160) to aspirate and dispense at varying volumes, such that the biological fluid sample diffuses across the hollow membrane fiber filter (140) and mixes with the binding solution, and further passing the mixture of biological fluid sample and the binding solution to a purification column (170) for biological fluid sample purification; thus achieving dynamic flow filtration of the biological fluid sample;
- cleaning the hollow membrane fiber filter (140) by passing a cleaning solution through the hollow membrane fiber filter (140);
- drawing an elution buffer into the purification column (170) by using a second syringe pump (160) for eluting the biological fluid sample mixture from the purification column (170);
- delivering the biological fluid sample to a titer detection system (180) for measuring titer concentration value of the biological fluid sample; and
- delivering the biological fluid sample from the titer detection system (180) to a pre-treatment unit (190) for biological fluid sample pre-treatment required before liquid chromatography-mass spectrometry analysis.

14. The method for handling the biological fluid sample of claim 13 comprising the additional steps of: Cleaning the purification column (170) by using strip buffer, and equilibrating the purification column (170) by using binding buffer.

15. The method for handling the biological fluid sample of claim 13 comprising the additional step of: cleaning the hollow membrane fiber filter (140) using 2% peroxide with 10 mM Ethylenediaminetetraacetic acid (EDTA) solution.

16. The method for handling the biological fluid sample of claim 13 comprising the additional step of: cleaning the hollow membrane fiber filter (140) using 70% ethyl alcohol (EtOH) solution.

* * * * *